(12) United States Patent
Cook

(10) Patent No.: US 6,862,344 B1
(45) Date of Patent: Mar. 1, 2005

(54) KEYPAD BROWSER

(76) Inventor: Kevin Michael Brooks Cook, 383 S. Locust Ave., Pleasant Grove, UT (US) 84062

( * ) Notice: Subject to any disclaimer, the term of this patent is extended or adjusted under 35 U.S.C. 154(b) by 29 days.

(21) Appl. No.: 10/336,295

(22) Filed: Jan. 3, 2003

(51) Int. Cl.[7] ............................................. H04M 1/64
(52) U.S. Cl. ................................. 379/88.24; 379/88.16
(58) Field of Search ........................... 379/67.1, 68, 70, 379/71, 72, 88.12, 88.16, 88.22–88.25, 88.27, 917, 90.01, 93.01, 93.18, 93.25, 93.26–93.28

(56) References Cited

U.S. PATENT DOCUMENTS

| | | | | |
|---|---|---|---|---|
| 4,932,021 A | * | 6/1990 | Moody | 379/88.23 |
| 5,488,650 A | * | 1/1996 | Greco et al. | 379/88.22 |
| 5,553,121 A | * | 9/1996 | Martin et al. | 379/88.01 |
| 5,655,006 A | * | 8/1997 | Cox et al. | 379/67.1 |
| 5,737,393 A | * | 4/1998 | Wolf | 379/88.13 |
| 5,771,276 A | * | 6/1998 | Wolf | 379/88.16 |
| 5,818,908 A | * | 10/1998 | Kaplan | 379/88.21 |
| 5,864,605 A | * | 1/1999 | Keshav | 379/88.01 |
| 6,014,428 A | * | 1/2000 | Wolf | 379/88.11 |
| 6,016,336 A | * | 1/2000 | Hanson | 379/88.23 |
| 6,295,342 B1 | * | 9/2001 | Kaminsky | 379/88.23 |
| 6,345,250 B1 | * | 2/2002 | Martin | 704/260 |
| 6,370,238 B1 | * | 4/2002 | Sansone et al. | 379/88.23 |
| 6,584,181 B1 | * | 6/2003 | Aktas et al. | 379/88.23 |

* cited by examiner

Primary Examiner—Fan S. Tsang
(74) Attorney, Agent, or Firm—Thorpe North & Western, LLP

(57) ABSTRACT

A telephone-based information announcement system provides a mouse-like selection means for user browsing, selection, and editing of audio information messages, for reducing user dependence on guidance regarding the use of the keypad, and for general purpose system control. The user presses any number on the right side of the keypad to go forward through an ordered list of messages, and any number on the left side of the keypad to go back. To link to a message in another list, the user presses 2.

20 Claims, 5 Drawing Sheets

KEYPAD BROWSER

FIELD OF THE INVENTION

This invention relates generally to call answering systems which play voice announcements to users over a telephone network. In particular, the invention relates to a system operation method for browsing and selecting from a plurality of announcements according to user input from a conventional telephone keypad.

BACKGROUND OF THE INVENTION

Call answering systems providing a plurality of announcements from which a user may select have become very common. Using such a system, a user presses a key or sequence of keys to specify the desired information. For example, a user specifies desired information by entering an extension number, or by selecting from a list of choices in a menu.

Requiring a user to specify desired information with a keypad presents many problems. One problem is that a user unfamiliar with the system must spend time and give attention to learning how to specify desired information by listening to guidance from the system. A user learns how to specify, for example, when listening to the message: "press 3 for location, press 8 for sales". Another problem is that the user generally needs to look at the keypad to press the appropriate key or keys. Another problem is that available information is often not easily browsed. Using the previous example, it may not be easy for a user to hear some information regarding "location" and then some information regarding "sales". Another problem is that it is generally not easy for an authorized user to make changes to the information system from the convenience of a telephone.

SUMMARY OF THE INVENTION

The object of the present invention is to provide an information announcement system that is easier to use and maintain. This is accomplished with a system that allows a user to browse and select from available information using navigational commands rather than requiring the user to specify desired information with arbitrary codes that must be known or learned.

The primary navigational commands are the Forward and Back commands. Using these commands a user may select from an ordered list of available announcements. Each announcement begins with a brief message introducing the content of the announcement to the user. The user uses this introduction to more quickly determine whether to continue listening or to select another. The user selects the next announcement im the list by going Forward and the previous announcement in the list by going Back. To go Forward, the user presses any number on the right side of the keypad. To go Back, the user presses any number on the left side of the keypad. The Back command is important because it reduces user worry that bypassed information will be difficult to find and hear later.

Because it is relatively easy to locate any number on the right or left sides of the keypad without looking at the keypad, and because multiple consecutive selections can be made with repeated pressing of the same key, the invention reduces the user's need to look at the keypad.

The system begins by selecting an initial announcement. The initial announcement contains a help message explaining the use of the keypad in locating desired information. The system then waits for and responds to user input according to the organization of the system and the currently selected announcement.

An authorized user may easily create and modify the list of announcements from the convenience of a telephone.

The system reduces the need for guidance sent to the user regarding the use of the keypad and can be used as a general-purpose audio interface for controlling an information system.

For situations in which specifying is preferrable to locating, as in user authorization, the system provides a mechanism for specifying using the "#" key.

BRIEF DESCRIPTION OF THE DRAWINGS

The invention will now be described in greater detail. The attached drawings provided diagrams of a sample application making use of the invention, flowcharts of an implementation of the invention and a diagram of the keypad interface of the invention.

DETAILED DESCRIPTION OF THE INVENTION

The following description describes the implementation of the invention in a preferred embodiment. It should be obvious to anyone skilled in the art how other embodiments could implement the invention.

Figure 1:
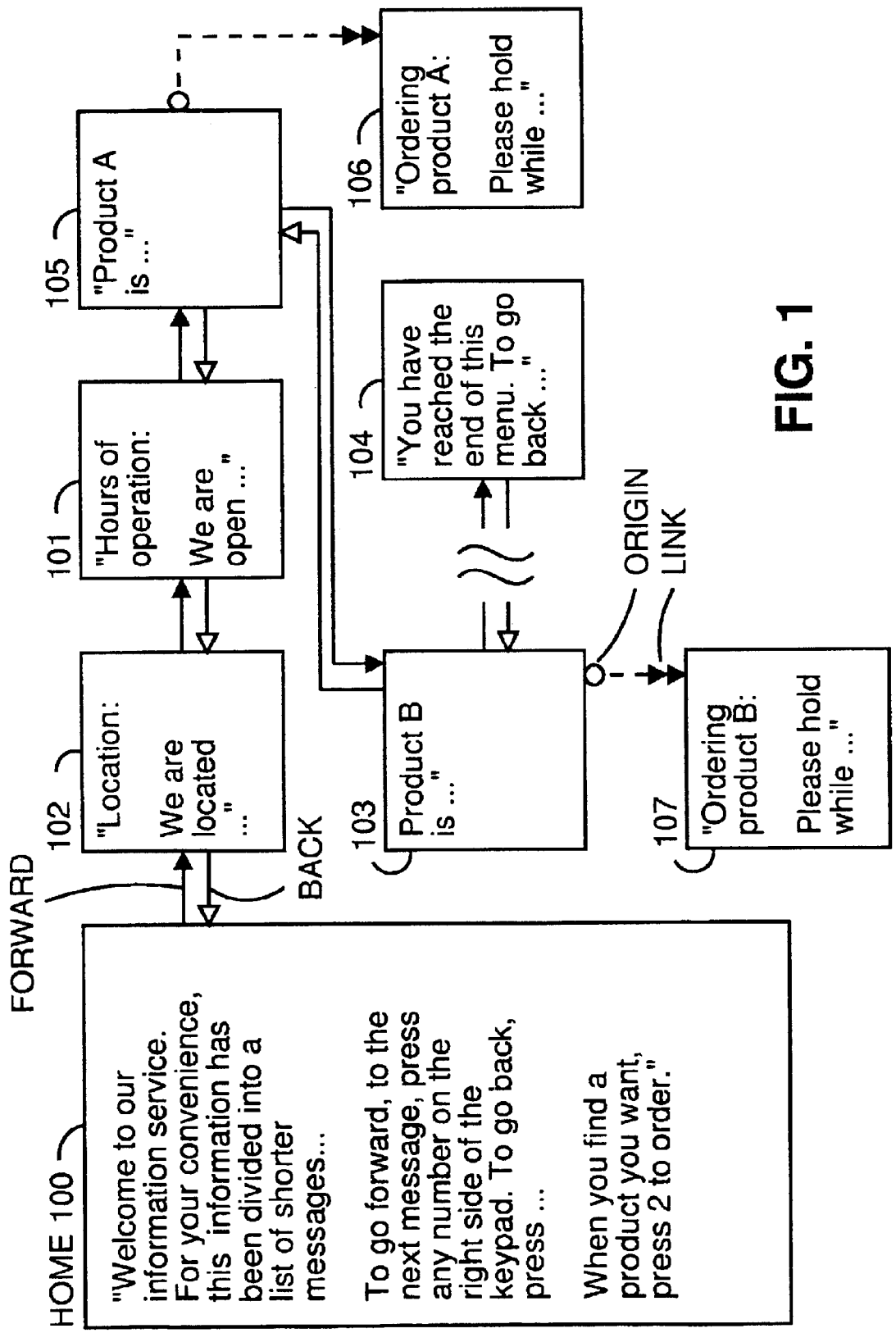
FIG. 1 is a diagram of a sample application making use of the invention.

FIG. 1 represents a sample application making use of the invention. The application is organized into a list of messages starting with message 100. Message 100 is followed in list order by 102, and then by 101, 105, and 103. Message 103 is followed by other messages. The list ends with message 104.

The user goes Forward from 100 to 102, and goes Back from 102 to 100. The user goes Forward from 102 to 101, and so on. The user can use the process of going Forward and Back to browse the entire list.

Messages 106 and 107 are not part of the list of messages. They are Linked to messages that are in the list. Message 106 is Linked to 105, and message 107 is Linked to 103.

Messages 106 and 107 are considered to be two separate lists of one message each. These lists could be expanded to include additional messages if needed.

The user Links from 103 to 107, and returns to an Origin from 107 to 103. Links are used to connect different lists of messages to each other. Using Links, the user can browse multiple lists.

The first message 100 is a welcome and a help message. This message explains how to use the keypad to browse the available information. The last message is also a help message and reminds the user that it is possible to continue browsing the list by going Back. Help messages are important because they are intended to give the user enough understanding to browse the system without the aid of prompts.

Figure 2:
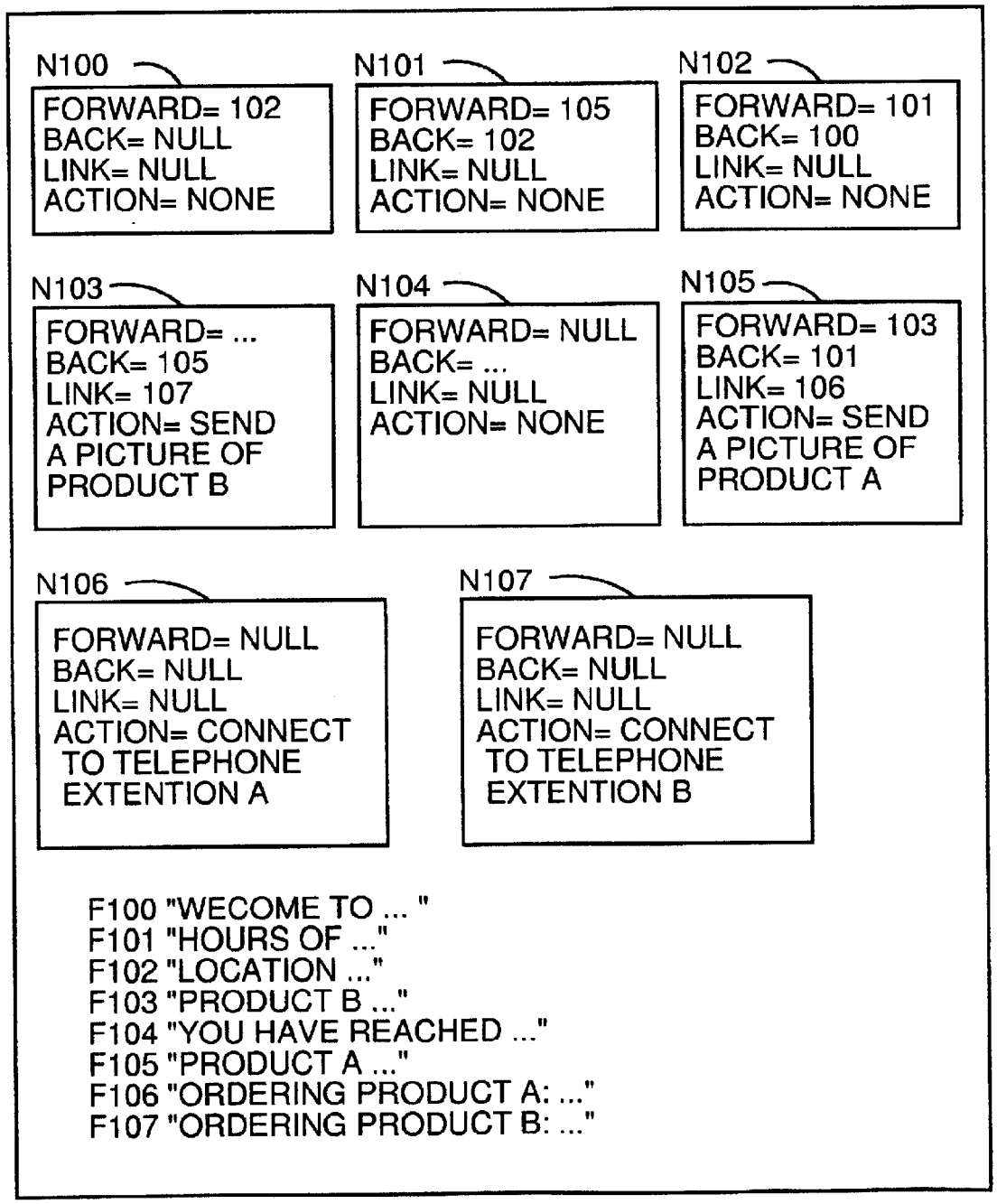
FIG. 2 is a diagram of the nodes and files used by the application of FIG. 1.

FIG. 2 represents the application of FIG. 1 from the system's point of view. The system stores the application as a series of nodes and files. The files contain the audio messages to be played to the user. The nodes contain the order in which the messages are organized. The message files are named after the node with which they are associated. Message 100 of FIG. 1 is represented by the combination of message file F100 and node N100. Messages 101–107 of FIG. 1 are likewise represented by the combination of message files F101–107 and nodes N101–107.

The system uses the Forward, Back, and Link references contained in a currently selected node in responding to user commands to go Forward, to go Back, and to Link. To return to an Origin, the system consults a separate record that it keeps of Origin nodes. This is because more than one Origin node may Link to the same Link node. When Linking, the system stores a reference to the Origin node. This reference is used to return from the Link.

Each node also contains a reference to any action to be initiated by the system when the node is selected. In the sample application, the system initiates the sending of pictures when nodes N103 and N105 are selected, and initiates the connecting of the user to extension telephones when nodes N106 and N107 are selected.

Node N100 is the Home node. The home node is selected first and is the node that represents the initial message to be sent to the user.

Figure 3A:
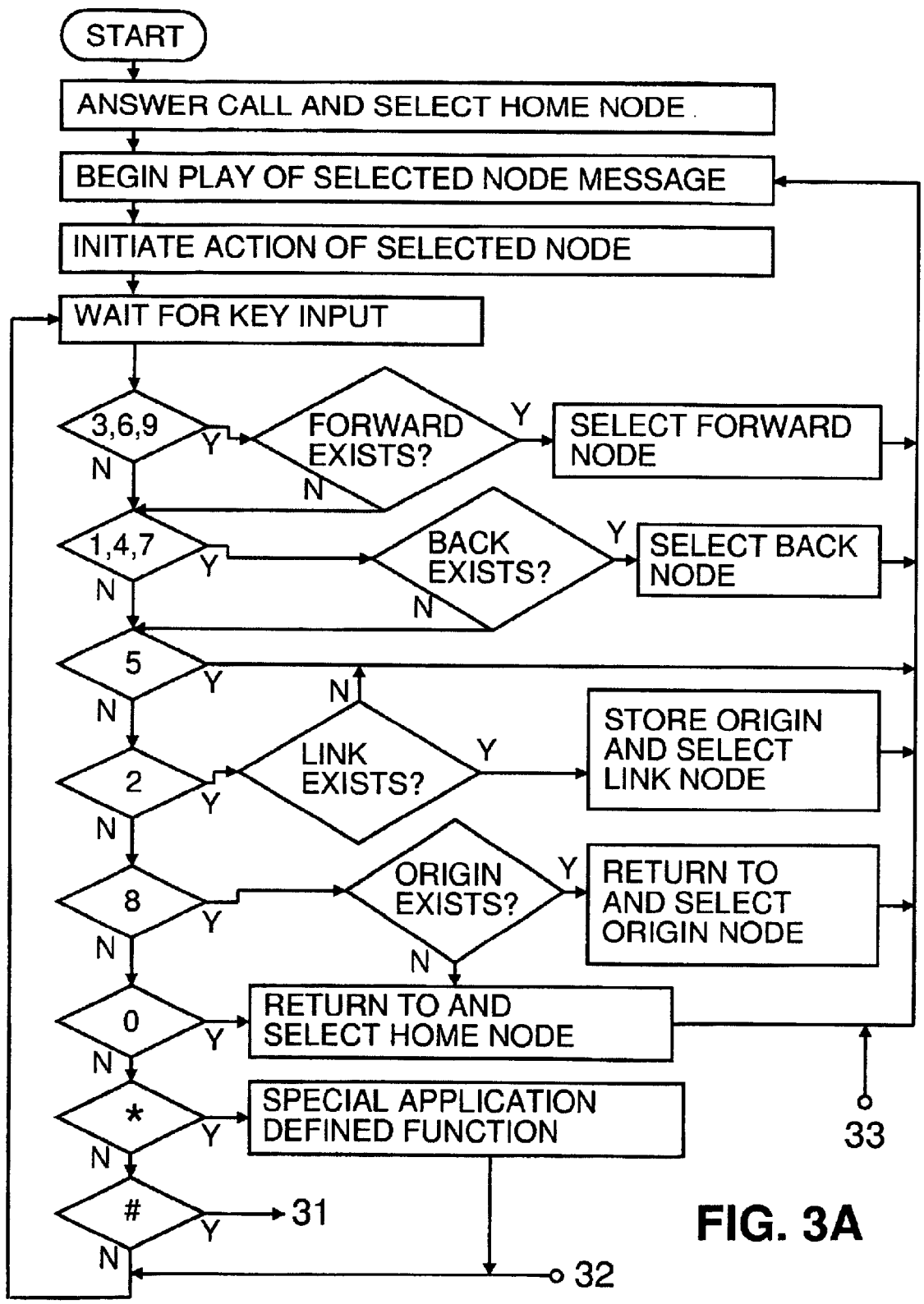
FIG. 3A is a flowchart of an implementation of the main body of the invention.

FIG. 3A is a flowchart of the main body of an implementation of the invention. The system starts by answering the call and selecting the Home node. The system then begins play of the selected node. The system then initiates the action of the selected node. The system then waits for keypad input from the user. In the sample application of FIG. 1, the system selects and begins play of the welcome and help message 100, and then waits for input.

The system does not select and begin to play another message without user input directing the system to do so. The reason for this is that system operation is based on the assumption that the user is satisfied with the current state of the system. The current state of the system includes a message that is playing, and a message that has finished playing. When a message finishes play, the user is free to think about the message, write a note about the message, talk to a friend about the message, handle an interruption, and so on, without being interrupted by the system with a next message, and without worry of missing information contained in a next message.

The user issues a Forward command by pressing "3", "6", or "9". Upon receiving a Forward command, the system checks the selected node for the existence of a Forward reference. If the Forward reference exists, the Forward node is selected. The system then begins play of the Forward node which has become the selected node. To begin play includes interrupting any message in process of play.

The user issues a Back command by pressing "1, "4", or "7". Upon receiving a Back command, the system checks the selected node for the existence of a Back reference. If the Back reference exists, the Back node is selected. The system then begins play of the Back node which has become the selected node.

In the case that a Forward or Back node does not exist, the system ignores the command and continues to wait for user input. It may be appropriate for the system to take other action if a Forward or Back node does not exist. If so, the system would be modified to suit the needs of the application. For example, if the user has Linked to the first node in another list and then issues a Back command, it may be appropriate for the system to return to the Origin in response to the Back command.

The user issues a Repeat command by pressing "5". Upon receiving a Repeat command, the system begins play of the same selected message.

The user issues a Link command by pressing "2". Upon receiving a Link command, the system checks the selected node for the existence of a Link reference. If a Link reference does not exist, the selected message is repeated. If a Link reference does exist, the Link node is selected. A reference to the Origin is stored for future use.

The user issues a Return command by pressing "8". Upon receiving a Return command, the system checks for the most recent reference to an Origin that it has stored. If no Origin exists, the home node is selected. If an Origin does exist, the system returns to the Origin. The system returns to the Origin, by selecting the Origin and removing the reference to it from storage.

The user issues a Home command by pressing "0". Upon receiving a Home command, the system returns to home by selecting the home node and removing all Origin references from storage.

The user has access to application functions by pressing "*" and "#". One function at a time may be designated by the application as a special function. The user has direct access to the special function by pressing "*". For example, an application might define a special pause function to pause or resume play of a message. The user accesses other functions by first pressing "#" and then pressing another key to specify the desired function.

Figure 3B:
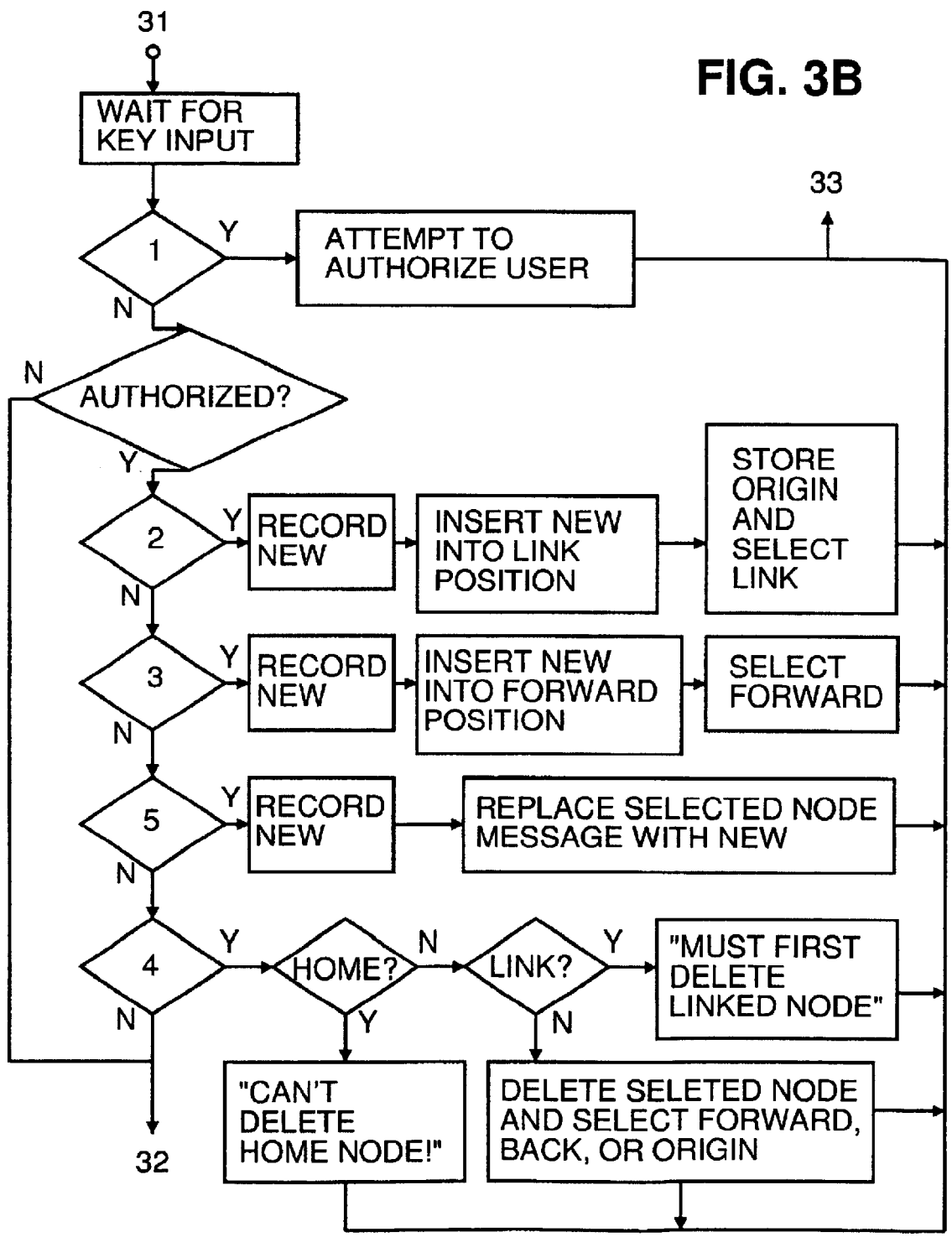
FIG. 3B is a flowchart of an implementation of the editing functions of the invention.

FIG. 3B is a flowchart of an implementation of the authorization and basic editing functions of the invention. FIG. 3B connects to FIG. 3A at the three common connection points: 31, 32, and 33.

Before editing, a user must first be authorized. The user enters an authorization code by first pressing "#" "1" and then entering an access code. If the code is correct, the user is authorized to use editing functions. The authorized user may browse available information and make changes where desired.

The user issues an Insert Link command by pressing "#" "2". Upon receiving an Insert Link command, the system records a new message from the user. The system creates a new node and associates it with the new message file. The new node is inserted into the Link position. The new Link node is selected and a reference to the Origin is stored.

Before selecting the new Link node, the system makes appropriate reference changes. A Link reference to the new node is stored in the selected node. The Forward, Back, and Link references of the new node are set to null.

The user issues an Insert Forward command by pressing "#" "3". Upon receiving and Insert Forward command, the system records a new message from the user. The system creates a new node and associates it with the new message file. The new node is inserted into the Forward position. The new Forward node is selected.

Before selecting the new node, the system makes appropriate reference changes. A Forward reference to the new node is stored in the selected node. The old Forward reference of the selected node is stored in the new node. A Back reference to the selected node is stored in the new node. If an old Forward node of the selected node exists, it becomes the Forward node of the new node. A Back reference to the new node is stored in the old Forward node. The Select reference of the new node is set to null.

The user issues a Change command by pressing "#" "5". Upon receiving a Change command, the system records a new message from the user The system then replaces the message file of the selected node with the new message file.

The user issues a Delete command by pressing "#" "4". Upon receiving a Delete command, the system checks to determine if the selected node is the Home node. The system does not allow deletion of the Home node. If the selected node is not the Home node, the system checks to determine if the selected node contains a sole reference to a Link node. The system does not allow a sole reference to a Link node to be deleted. A sole reference is a reference that is not found elswhere. If the selected node does not contain a sole Link reference, the selected node is deleted. The system selects the first existing node of Forward, Back, and Origin.

Before deleting the selected node, the system makes appropriate reference changes. If a Forward node exists, the Back reference of the selected node is stored in the Forward node. If a Back node exists, the Forward reference of the selected node is stored in the Back node.

If an Origin node Links to the selected node, the Link reference of the Origin node is changed. If a Forward node exists, a Link reference to the Forward node is stored in the Origin node. If a Forward node does not exist and a Back node does exist, a Link reference to the Back node is stored in the Origin node. If no Forward or Back nodes exist, a null Link reference is stored in the Origin node.

The system may also include advanced editing functions such as, marking a set of nodes, copying, moving, and defining an action. The system may also include advanced browsing functions such as, searching, going Forward and Back by increments greater than one, and jumping to the end of a list.

The system may also include means to automatically modify available information. For example, an application for accessing bank account information, would generate account information messages automatically for the user.

Figure 4:
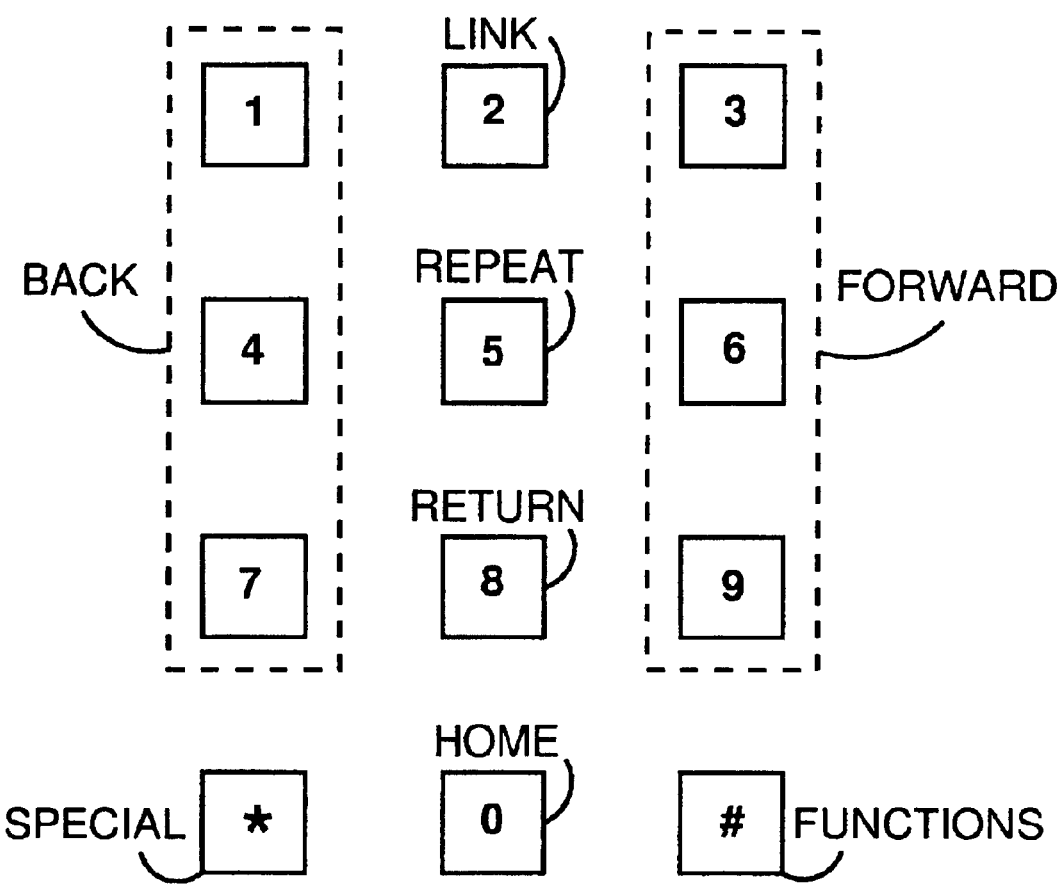
FIG. 4 is a diagram of the keypad interface of an embodiment of the invention.

FIG. 4. is a diagram illustrating the keypad interface of the invention. It should be noted that the most basic commands of the interface, Forward and Back, are easily accessible without looking at the keypad. It may also be noted that the interface somewhat resembles a computer mouse in functionality and appearance. The primary purpose of the invention is to make accessing an information system by telephone more convenient for the user. The design of the keypad interface is an important element in achieving that end.

While certain specific embodiments of the invention have been illustrated and described it will be apparent to one skilled in the art that numerous alternatives or variations can be made to the basic inventive concept. It is to be understood that any such changes will fall within the scope of the invention as defined by the appended claims.

I claim:

1. A telephone-based audio information announcement system adapted to provide a user with audible information messages, comprising:

sequentially ordered list of audio information messages wherein the audio information messages are defined independently of key labels of a telephone keypad;

a keypad input configured to wait for input from the user before playing an audio information message wherein the input is a navigational command indicating a desired direction of movement through the sequentially ordered list of audio information messages independent of content in the audio information messages;

a forward navigator configured to activate play of a next audio information message from the sequentially ordered list of audio information messages, the next audio information message immediately succeeding in list order a currently selected audio information message from the sequentially ordered list of audio information messages, in response to a first pre-determined user input navigational command; and a backward navigator configured to activate play of a previous audio information message from the sequentially ordered list of audio information messages, the previous audio information message immediately preceding in list order the currently selected message, in response to a second pre-determined user input navigational command.

2. A system as defined in claim 1, further comprising:

a user verifier configured to verify that a user is authorized to make changes to the sequentially ordered list of audio information messages;

a message recorder configured to record a new audio information message from the user and insert the new audio information message into the sequentially ordered list of audio information messages at a point immediately adjacent to the currently selected audio information message.

3. A system as defined in claim 1, further comprising a message deleter configured to delete the currently selected audio information message from the sequentially ordered list of audio information messages.

4. A system as defined in claim 1, further comprising a message changer configured to record a new audio information message from the user and to replace the currently selected audio information message with the new audio information message.

5. A system as defined in claim 1, wherein the first pre-determined user input navigational command comprises the user pressing any number of the right side of the telephone keypad; and the second pre-determined user input navigational command comprises the user pressing any number of the left side of the telephone keypad.

6. A system as defined in claim 1, further comprising a link playback configured to select and begin to play a link audio information message, the link audio information message being related in content to the currently selected message, in response to a third pre-determined user input navigational command.

7. A system as defined in claim 6, wherein the third pre-determined user input navigational command comprises the user pressing key in a center row of the telephone keypad.

8. A system as defined in claim 1, further comprising a message repeat button configured to play the currently selected audio information message, in response to a pre-determined user input navigational command.

9. A system as defined in claim 1, further comprising an action associator configured to associate an action definition with a message in the sequentially ordered list; and configured to define the time at which the action will begin as the time at which the associated message is selected.

10. A method in a telephone-based audio information announcement system for browsing and selecting information announcements to be played, comprising:

defining a sequentially ordered list of audio information messages, wherein audio information messages are defined independently of key labels of a telephone keypad;

waiting for a user input navigational command through the telephone keypad, wherein the navigational command indicates a desired direction of movement through the sequentially ordered list of audio information messages independent of content in the audio information messages;

playing a next audio information message from the sequentially ordered list of audio information messages, the next audio information message immediately succeeding in list order a currently selected audio information message from the sequentially ordered list of audio information messages, when the navigational command is a first pre-determined user input navigational command; and playing a previous audio information message from the sequentially ordered list of audio information messages, the previous message immediately preceding in list order the currently selected message, when the navigational command is a second pre-determined user input navigational command.

11. The method of claim 10, further comprising, verifying that a user is authorized to make changes to the sequentially ordered list of audio information messages;

recording a new audio information message from the user; and inserting the new audio information message into the sequentially ordered list of audio information messages at a point immediately adjacent to the currently selected message.

12. The method of claim 10, further comprising, deleting the currently selected message from the sequentially ordered list.

13. The method of claim 10, further comprising, recording a new message from the user and replacing the currently selected message with the new message.

14. The method of claim 10, wherein the first pre-determined user input navigational command comprises the user pressing any key in a first part of a keypad and the second pre-determined user input navigational command comprises the user pressing any key in a second part of the keypad.

15. The method of claim 10, further comprising, selecting and beginning to play a link message, the link message being related in content to the currently selected message, in response to a third pre-determined user input.

16. The method of claim 15, wherein the third predetermined user input comprises the user pressing a key in a center row of the telephone keypad.

17. The method of claim 10, further comprising, beginning to play the currently selected message, in response to a predetermined user input.

18. The method of claim 10, further comprising:

associating action definition with a message in the sequentially ordered list; and defining the time at which the action will begin as the time at which the associated message is selected.

19. The method of claim 14, wherein the first area of the keypad comprises the left side of the keypad and wherein the second area of the keypad comprises the right side of the keypad.

20. The method of claim 14, wherein the first area of the keypad comprises the 3, 6, and 9 key and wherein the second area of the keypad comprises the 1, 4, and 7 key.

* * * * *